US012683643B2

(12) United States Patent
Yang et al.

(10) Patent No.: US 12,683,643 B2
(45) Date of Patent: Jul. 14, 2026

(54) MIDDLE FRAME AND ELECTRONIC DEVICE

(71) Applicant: Huawei Technologies Co., Ltd., Shenzhen (CN)

(72) Inventors: Tao Yang, Shenzhen (CN); Shaohui Zhang, Shenzhen (CN); Yong Zhao, Shenzhen (CN); Guoliang Huo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 347 days.

(21) Appl. No.: 18/557,757

(22) PCT Filed: Apr. 20, 2022

(86) PCT No.: PCT/CN2022/087950
§ 371 (c)(1),
(2) Date: Oct. 27, 2023

(87) PCT Pub. No.: WO2022/228239
PCT Pub. Date: Nov. 3, 2022

(65) Prior Publication Data
US 2024/0372576 A1 Nov. 7, 2024

(30) Foreign Application Priority Data
Apr. 30, 2021 (CN) .......................... 202110486538.8

(51) Int. Cl.
*H04M 1/02* (2006.01)
*H04B 1/3888* (2015.01)

(52) U.S. Cl.
CPC ........ *H04B 1/3888* (2013.01); *H04M 1/0277* (2013.01)

(58) Field of Classification Search
CPC ...... H04M 1/02; H04M 1/0277; H04B 1/3888
See application file for complete search history.

(56) References Cited

FOREIGN PATENT DOCUMENTS

| | | |
|---|---|---|
| CN | 107087364 A | 8/2017 |
| CN | 108323061 A | 7/2018 |
| CN | 110022390 A | 7/2019 |
| CN | 110234216 A | 9/2019 |
| CN | 110267499 A | 9/2019 |
| CN | 211296798 U | 8/2020 |

*Primary Examiner* — Tuan H Nguyen
(74) *Attorney, Agent, or Firm* — Conley Rose, P.C.

(57) ABSTRACT

A middle frame includes a flat part and a first recess part that are integrally molded, where the first recess part is recessed relative to a first surface of the flat part to form a first groove, where an opening is located on the first surface; the first recess part includes a bottom wall, a first side wall, and a second side wall, where an orientation of the bottom wall is the same as that of the first surface, the first side wall and the second side wall separately intersect the bottom wall, and the first side wall is connected to the second side wall; and an opening formed by the first side wall and the second side wall is gradually enlarged in a first direction parallel to a flow direction of a die casting material in a die casting molding process of the middle frame.

20 Claims, 9 Drawing Sheets

MIDDLE FRAME AND ELECTRONIC DEVICE

CROSS-REFERENCE TO RELATED APPLICATIONS

This application is a U.S. National Stage of International Patent Application No. PCT/CN2022/087950 filed on Apr. 20, 2022, which claims priority to Chinese Patent Application No. 202110486538.8 filed on Apr. 30, 2021. Both of the aforementioned applications are hereby incorporated by reference in their entireties.

TECHNICAL FIELD

Embodiments of this application relate to the field of electronic device technologies, and in particular, to a middle frame and an electronic device.

BACKGROUND

In the field of consumer electronic devices, especially mobile phones, a thickness of an entire machine is one of key factors that affect product precision. In a conventional technology, a middle frame includes a flat part and a recess part that is recessed relative to the flat part, and a groove of the recess part is configured to accommodate another part of an electronic device, to reduce an overall thickness of the electronic device. However, after the middle frame is molded through die casting, a thickness of the flat part is large, which affects the overall thickness of the electronic device.

SUMMARY

Embodiments of this application provide a middle frame and an electronic device including the middle frame. The middle frame includes a flat part and a recess part that are integrally molded, the recess part is recessed relative to the flat part to form a groove, and a thickness of the flat part is small.

According to a first aspect, this application provides a middle frame. The middle frame is prepared by using a die casting process. The die casting molding process is a casting method in which a molten material fills a mold cavity at a high speed under a high pressure, and the material solidifies under the pressure to form a die casting member. In this embodiment, the middle frame is prepared by using the die casting molding process, so that costs of the middle frame are reduced, and efficiency of molding the middle frame is improved.

The middle frame includes a flat part and a first recess part that are integrally molded. The first recess part is recessed inward relative to a first surface of the flat part to form a first groove. An opening of the first groove is located on the first surface. The first recess part includes a bottom wall, a first side wall, and a second side wall. An orientation of the bottom wall is the same as an orientation of the first surface, the first side wall and the second side wall separately intersect the bottom wall, and the first side wall is connected to the second side wall. An opening formed by the first side wall and the second side wall is gradually enlarged in a first direction, and in a die casting molding process of the middle frame, the first direction is parallel to a flow direction of a die casting material.

In this embodiment, the opening formed by the first side wall and the second side wall is gradually enlarged in the first direction, and the opening direction is parallel to the flow direction of the material in the die casting molding process of the middle frame. The material gradually disperses along mold cavity side walls corresponding to the first side wall and the second side wall, so that flow blocking of the material by the mold cavity side walls corresponding to the first side wall and the second side wall is reduced, a risk that a material on a rib in a slag discharge side is likely to turn cold is reduced, and a large thickness of the flat part of the middle frame is avoided. This facilitates overall thinning of the middle frame.

In the flow direction of the material, a smaller angle formed by the first side wall and the second side wall indicates a smaller angle formed by the first side wall or the second side wall and the flow direction of the material, and smaller flow blocking of the material by the first side wall or the second side wall. It may be understood that when the first side wall or the second side wall is perpendicular to the flow direction of the material, and the first side wall or the second side wall and the flow direction of the material form an acute angle, a partial structure of the first side wall or the second side wall is away from the flow direction of the material. As a result, flow blocking of the material by the first side wall or the second side wall is large.

In a possible implementation, the angle formed by the first side wall and the second side wall is an acute angle.

A specific angle formed by the first side wall and the second side wall is not limited in this application. For example, the angle formed by the first side wall and the second side wall is less than or equal to 80 degrees.

In this embodiment of this application, the angle formed by the first side wall and the second side wall is an acute angle. The angle formed by the first side wall and the second side wall is small. In the die casting molding process of the middle frame, flow blocking of the material by the first side wall and the second side wall is small, and flow blocking of the material by a groove wall of the first groove is further reduced. This further facilitates thinning of the flat part.

In a possible implementation, an area of the bottom wall is large, and a bonding area between the middle frame and a circuit board is increased. This ensures stability of bonding the circuit board and the middle frame by the bonding layer. For example, the angle formed between the first side wall and the second side wall is greater than or equal to 15 degrees, to avoid a small area of the bottom wall caused by a small angle formed by the first side wall and the second side wall. It may be understood that the angle formed by the first side wall and the second side wall should not be excessively small or excessively large.

A specific value of the acute angle formed by the first side wall and the second side wall is not limited in this application. A person skilled in the art can design this based on an actual requirement.

In a possible implementation, a shape of the bottom wall includes a quadrilateral, a triangle, or the like. For example, the shape of the bottom wall includes a rhombus or an equilateral triangle.

In this embodiment, when the opening formed by the first side wall and the second side wall is gradually enlarged in the first direction, the shape of the bottom wall may be a triangle, or may be a parallelogram. In another embodiment, the bottom wall may alternatively be in another shape, for example, a pentagon, a hexagon, or the like. This is not limited in this application.

In a possible implementation, the first recess part is recessed relative to the flat part to further form a second groove. An opening direction of the second groove is the same as an opening direction of the first groove. The first groove is located in the second groove, and a groove depth of the first groove is greater than a groove depth of the second groove. The first groove and the second groove are configured to accommodate different parts in an electronic device.

In this embodiment, the middle frame is provided with the first groove and the second groove, the first groove is located in the second groove, and both the first groove and the second groove are configured to accommodate a part in the electronic device, so that an overall thickness of the electronic device in which the middle frame is used is small.

In a possible implementation, the flat part is provided with a second surface that is opposite to the first surface. The first groove is recessed from a side that is of the first surface and that faces the second surface, and a side that is of the bottom wall and that is away from the first surface protrudes relative to the second surface. It may be understood that when groove depths of the first grooves are equal, and a side that is of a bottom wall of the first groove and that is away from the first surface protrudes relative to the second surface, the bottom wall of the first groove is thicker.

In this embodiment, the side that is of the bottom wall of the first groove and that is away from the first surface protrudes relative to the second surface, and this increases a thickness of the bottom wall of the first groove. In a process of molding the middle frame, flow blocking of the material in the mold cavity corresponding to the first groove is small, the risk that the material on the rib in the slag discharge side is likely to turn cold is reduced, and the large thickness of the flat part of the molded middle frame is avoided. This facilitates thinning of the flat part of the middle frame.

In a possible implementation, the middle frame includes a first plate, a second plate, and a third plate that are sequentially connected, and the first plate, the second plate, and the third plate are configured to carry different parts. The second plate includes a first end part and a second end part that are disposed oppositely, the first end part is connected to the first plate, the second end part is connected to the third plate, and the second groove extends from the first end part to the second end part. There are a plurality of first grooves, and the plurality of first grooves are spaced, and are all located in the second groove.

For example, the plurality of first grooves are configured to accommodate a plurality of bonding layers in a one-to-one correspondence, and the plurality of bonding layers are configured to be bonded to different parts of the first recess part, to improve stability between the middle frame and a corresponding bonding member. Shapes of the plurality of first grooves may be the same or may be different. This is not limited in this application. A quantity of the first grooves is not limited in this application either.

In a possible implementation, the middle frame further includes a second recess part. The second recess part and the flat part are integrally molded, and the second recess part is recessed relative to the flat part to form a third groove and a fourth groove. Both the third groove and the fourth groove are recessed from the side that is of the first surface and that faces the second surface, the fourth groove is located in the third groove, and a recess depth of the fourth groove is greater than a recess depth of the third groove.

In this embodiment, the middle frame is further provided with the second recess part that is integrally molded with the flat part. The second recess part is configured to accommodate another part in the electronic device, for example, a connection member. The connection member is accommodated in the middle frame, so that the connection member shares a thickness with the middle frame. This reduces the overall thickness of the electronic device.

The third groove and the second groove are disposed in a staggered manner in the first direction, and the fourth groove and the first groove are disposed in a staggered manner in a second direction; and the second direction is perpendicular to the first direction.

In this embodiment, the fourth groove and the first groove are disposed in a staggered manner in both the first direction and the second direction, so that an overlapping area between the fourth groove and the first groove is reduced. In the process of molding the middle frame, double or multiple flow blocking of the material by the mold cavity in a same direction is avoided, and a risk of a cold material on the rib in the slag discharge side in the mold cavity is reduced. This further reduces a thickness of the flat part.

In a possible implementation, a shape of the fourth groove is the same as a shape of the first groove, and an opening formed by two adjacent side walls of the fourth groove is gradually enlarged in the first direction. For example, both a bottom wall of the fourth groove and the bottom wall of the first groove are in a rhombus shape. A groove depth of the fourth groove is the same as the groove depth of the first groove, and a groove depth of the third groove is the same as the groove depth of the second groove.

In this embodiment, the shape of the fourth groove is the same as the shape of the first groove, and the opening formed by the two adjacent side walls of the fourth groove is gradually enlarged. In the die casting molding process of the middle frame, flow blocking of the material by a mold cavity structure corresponding to the first recess part is reduced, flow blocking of the material by a mold cavity structure corresponding to the second recess part is also reduced, and the risk that the material on the rib in the slag discharge side is likely to turn cold is reduced. This further facilitates thinning of the flat part.

In another possible implementation, the shape of the fourth groove may alternatively be different from the shape of the first groove. This is not limited in this application. For example, the bottom wall of the first groove is in a rhombus shape, and the bottom wall of the fourth groove is in a rectangle shape.

According to a second aspect, this application further provides a middle frame. The middle frame is prepared by using a die casting process. The middle frame includes a flat part and a first recess part that are integrally formed, the first recess part is recessed relative to the flat part to form a first groove, and the flat part is provided with a first surface and a second surface that are disposed oppositely. The first surface faces a battery, the first groove is recessed from a side that is of the first surface and that faces the second surface, and a side that is of a bottom wall of the first groove and that is away from the first surface protrudes relative to the second surface.

It may be understood that when groove depths of the first grooves are equal, and the side that is of the bottom wall of the first groove and that is away from the first surface protrudes relative to the second surface, the bottom wall of the first groove is thicker.

In this embodiment, the side that is of the bottom wall of the first groove and that is away from the first surface protrudes relative to the second surface, and this increases a thickness of the bottom wall of the first groove. In a process of molding the middle frame, flow blocking of a material in a mold cavity corresponding to the first groove is small, a risk that a material on a rib in a slag discharge side is likely to turn cold is reduced, and a large thickness of the flat part of a molded middle frame is avoided. This facilitates thinning of the flat part of the middle frame.

According to a third aspect, this application provides an electronic device. The electronic device includes a battery and the middle frame according to any one of the first aspect or the second aspect, and the battery is installed on the middle frame. A projection of the battery on the middle frame covers a flat part and a recess part. The battery is configured to supply power to each component and part inside the electronic device. For example, the battery is carried in a middle area of the middle frame.

In a possible implementation, the electronic device further includes a circuit board and a bonding layer. Projection coverage of the circuit board on the middle frame at least partially overlaps the first recess part. The bonding layer is connected between the circuit board and the first recess part, and the bonding layer is accommodated in the first groove.

In this embodiment, the bonding layer is configured to fasten the circuit board on the middle frame. A material of the bonding layer is not limited in this application. A person skilled in the art can design this based on an actual requirement. For example, the bonding layer may be a double-sided tape.

In this embodiment, both the circuit board and the bonding layer are accommodated in an accommodation space formed by the first recess part, so that the circuit board and the bonding layer share a thickness with the middle frame. This reduces an overall thickness of the electronic device.

According to a fourth aspect, this application further provides an electronic device. The electronic device includes a battery, a display, a middle frame, and an auxiliary member. Both the battery and the display are installed on the middle frame, the battery and the display are separately located on two sides that are of the middle frame and that are disposed oppositely, and the auxiliary member is located between the middle frame and the display.

The middle frame includes a flat part and a first recess part that are integrally molded. The first recess part is recessed relative to the flat part to form a first groove, the flat part is provided with a first surface and a second surface that are disposed oppositely, and the first surface faces the battery. The first groove is recessed from a side that is of the first surface and that faces the second surface, and a side that is of a bottom wall of the first groove and that is away from the first surface protrudes relative to the second surface. The auxiliary member is installed on the second surface, and a portion that is of the bottom wall of the first groove and that protrudes relative to the second surface is embedded in the first auxiliary member.

In this embodiment, the auxiliary member is installed on the second surface, and the portion that is of the bottom wall of the first groove and that protrudes relative to the second surface is embedded in the first auxiliary member. In this embodiment, a structure that is of the first recess part and that protrudes relative to the flat part is embedded in the auxiliary member, and the auxiliary member absorbs the structure that is of the first recess part and that protrudes relative to the flat part, so that the display can be flat installed relative to the middle frame.

It may be understood that a side that is of the auxiliary member and that is away from the second surface is a flat surface, so that the display is flat installed on the auxiliary member. For example, when the auxiliary member is a cooling fin, the side that is of the auxiliary member and that is away from the second surface is a flat surface, so that the display is in full contact with the auxiliary member. This improves cooling effect of the auxiliary member on the display.

For example, the auxiliary member may be but is not limited to a cooling fin. The cooling fin is configured to cool the display, to improve reliability of the electronic device.

In a possible implementation, the first recess part is recessed relative to the flat part to further form a second groove, and an opening direction of the second groove is the same as an opening direction of the first groove; and the first groove is located in the second groove, and a groove depth of the first groove is greater than a groove depth of the second groove. The electronic device further includes a circuit board and a bonding layer, the bonding layer is connected between the circuit board and the recess part, the bonding layer is accommodated in the first groove, and a partial structure of the circuit board is accommodated in the second groove.

In this embodiment, the groove depth of the first groove is greater than the groove depth of the second groove, so that the bonding layer is accommodated in the first groove. A partial structure of the circuit board is accommodated in the second groove, so that the bonding layer and the circuit board share a thickness with the middle frame. This reduces an overall thickness of the electronic device.

BRIEF DESCRIPTION OF DRAWINGS

To describe the technical solutions in embodiments of this application or in the background, the following briefly describes the accompanying drawings for describing embodiments of this application or the background.

DESCRIPTION OF EMBODIMENTS

The following describes embodiments of this application with reference to the accompanying drawings in embodiments of this application.

Figure 1:
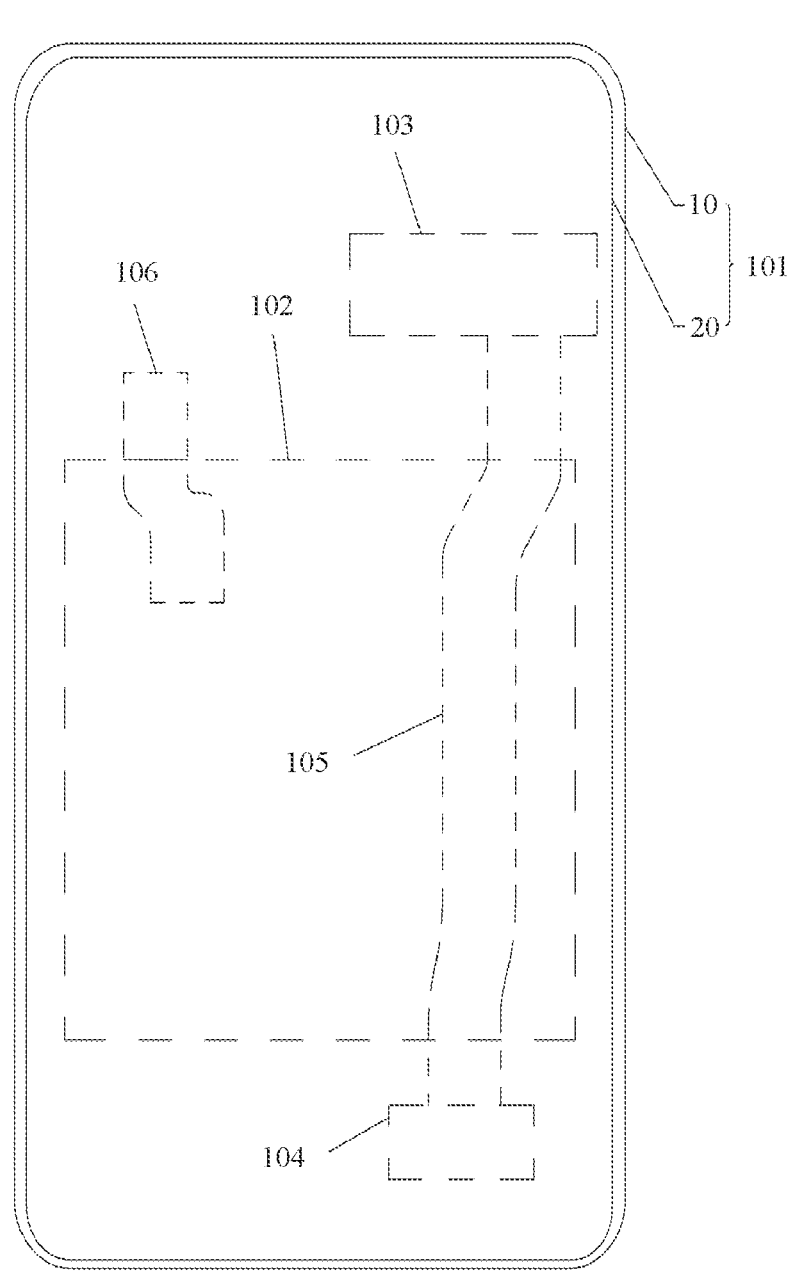
FIG. 1 is a schematic diagram of a structure of an electronic device according to an embodiment of this application.

Refer to FIG. 1. FIG. 1 is a schematic diagram of a structure of an electronic device 100 according to an embodiment of this application. The electronic device 100 may be a product such as a mobile phone, a tablet computer, a notebook computer, an in-vehicle device, a wearable device, or the like. This is not limited in this application. The wearable device may be a smart band, a smart watch, augmented reality (augmented reality, AR) glasses, virtual reality (virtual reality, VR) glasses, or the like. In this embodiment of this application, an example in which the electronic device 100 is a mobile phone is used for description.

As shown in FIG. 1, the electronic device 100 includes a housing 101, and a battery 102, a motherboard 103, a secondary board 104, and a circuit board 105 that are located inside the housing 101. The battery 102 is configured to supply power to each component and part inside the electronic device 100. The motherboard 103 (motherboard, Mobo), also referred to as a host board, a system board, a logic board, a mother board, a baseboard, or the like, is a center or a main circuit board that forms a complex electronic system such as the electronic device 100. The motherboard 103 integrates operation management of the electronic device 100. The motherboard 103 is connected to the secondary board 104 and an external accessory. The external accessory may be but is not limited to a memory card, a subscriber identity module (subscriber identity module, SIM) card, a charging interface, or the like. The battery 102 is located between the motherboard 103 and the secondary board 104. The motherboard 103 and the secondary board 104 are separately located at two ends of the battery 102. The circuit board 105 is electrically connected between the motherboard 103 and the secondary board 104, and the circuit board 105 extends from one end of the battery 102 to the other end of the battery 102. The circuit board 105 may be but is not limited to a flexible circuit board. A shape, a size, a position, or the like of the battery 102, the motherboard 103, the secondary board 104, or the circuit board 105 shown in FIG. 1 is merely an example. This is not limited in this application.

In some embodiments, the electronic device 100 further includes a connection member 106. The connection member 106 and the circuit board 105 are spaced. The connection member 106 is electrically connected between the battery 102 and the motherboard 103, to electrically connect the battery 102 to a component and part inside the electronic device 100. The connection member 106 may be but is not limited to a flexible circuit board 105. For example, the connection member 106 and the circuit board 105 are located on a same side of the middle frame.

Figure 2:
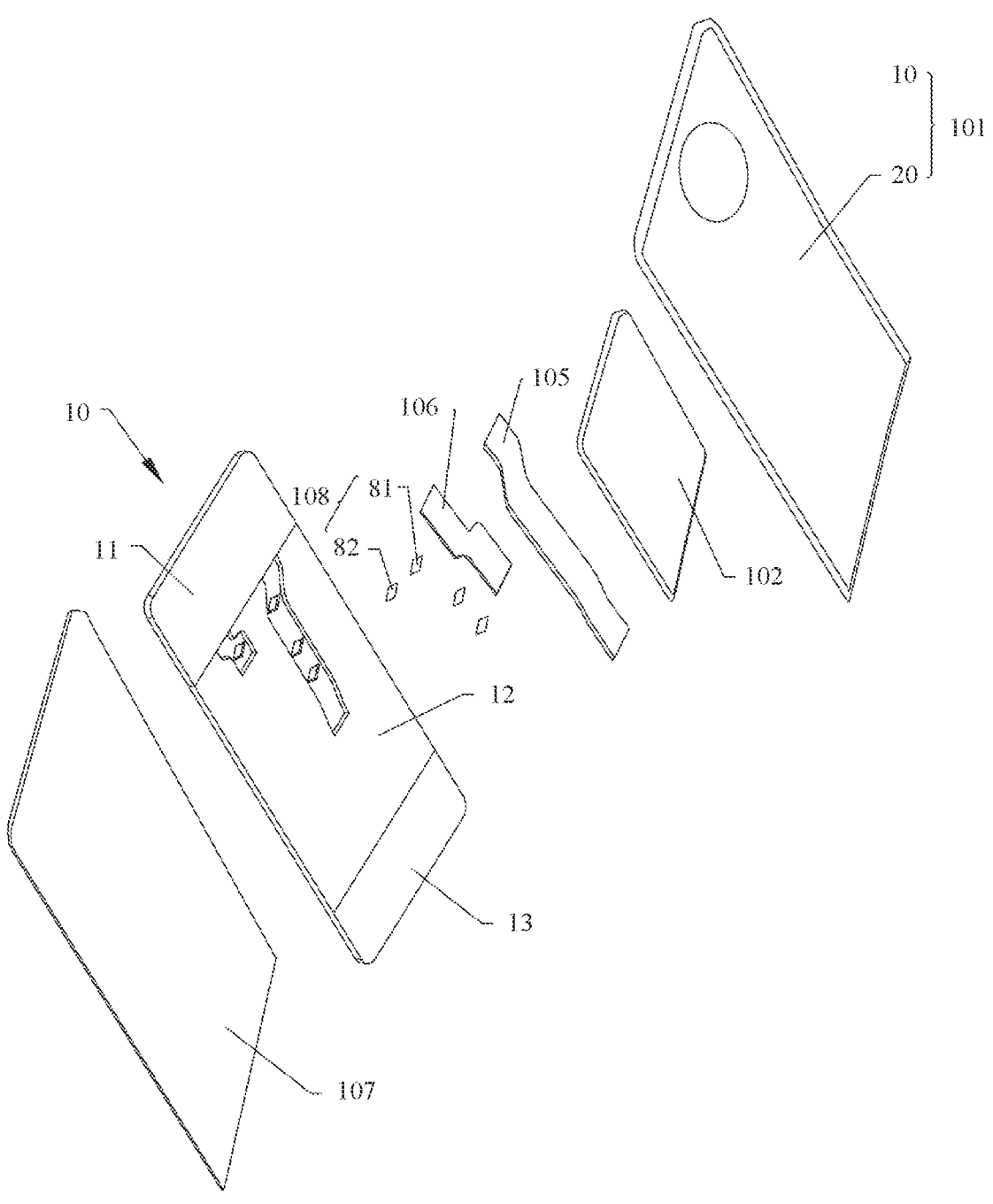
FIG. 2 is a schematic diagram of a partial exploded structure of the electronic device shown in FIG. 1.

Refer to FIG. 1 and FIG. 2 together. FIG. 2 is a schematic diagram of a partial exploded structure of the electronic device 100 shown in FIG. 1. The electronic device 100 further includes a display 107. The display 107 is configured to display an image. The display 107 may be a flat screen, or may be a curved screen. This is not limited in this application. The housing 101 includes a middle frame 10 and a rear cover 20 installed on the middle frame 10. The middle frame 10 provides a carrying function, for example, carrying one or more of the motherboard 103, the secondary board 104, the circuit board 105, the display 107, or the battery 102. For example, the display 107 and the battery 102 are separately located on two sides that are of the middle frame 10 and that are disposed oppositely. Shapes of the middle frame 10 and the rear cover 20 in the figure are merely examples. This is not limited in this application.

As shown in FIG. 2, the electronic device 100 further includes a bonding layer 108, and the bonding layer 108 is configured to fasten the circuit board 105 and the connection member 106 to the middle frame 10. In this embodiment, the circuit board 105 and the connection member 106 are directly fastened to the middle frame 10 through the bonding layer 108, to facilitate assembly of the electronic device 100. A material of the bonding layer 108 is not limited in this application. A person skilled in the art can design this based on an actual requirement. For example, the bonding layer 108 may be a double-sided tape.

In some embodiments, the battery 102, the circuit board 105, the connection member 106, the motherboard 103, and the secondary board 104 are located on a same side of the middle frame 10. The rear cover 20 is located on a side that is of the battery 102 and that is away from the display 107. The rear cover 20 is fastened to the middle frame 10, to protect structures such as the circuit board 105 and the battery 102 carried on the middle frame 10. A shape, a material, or the like of the rear cover 20 is not limited in this application. A person skilled in the art can design this based on an actual requirement.

In some embodiments, the circuit board 105 and the connection member 106 are arranged in a staggered manner, to avoid that the circuit board 105 and the connection member 106 are stacked. This facilitates thinning of the electronic device 100. For example, the connection member 106 is located at an end part of the battery 102, to electrically connect the battery 102 to a component and part inside the electronic device 100. The circuit board 105 extends from one end of the battery 102 to the other end of the battery 102, to connect the motherboard 103 and the secondary board 104.

Still refer to FIG. 1 and FIG. 2. The middle frame 10 includes a first plate 11, a second plate 12, and a third plate 13 that are sequentially connected. The first plate 11, the second plate 12, and the third plate 13 are configured to carry different parts. For example, the first plate 11 is configured to carry the motherboard 103, the second plate 12 is configured to carry the battery 102, and the third plate is configured to carry the secondary board 104. The second plate 12 includes a first end part and a second end part that are disposed oppositely. The first end part is connected to the first plate 11, and the second end part is connected to the third plate 13. For example, the first plate 11, the second plate 12, and the third plate 13 are integrally molded.

Figure 3:
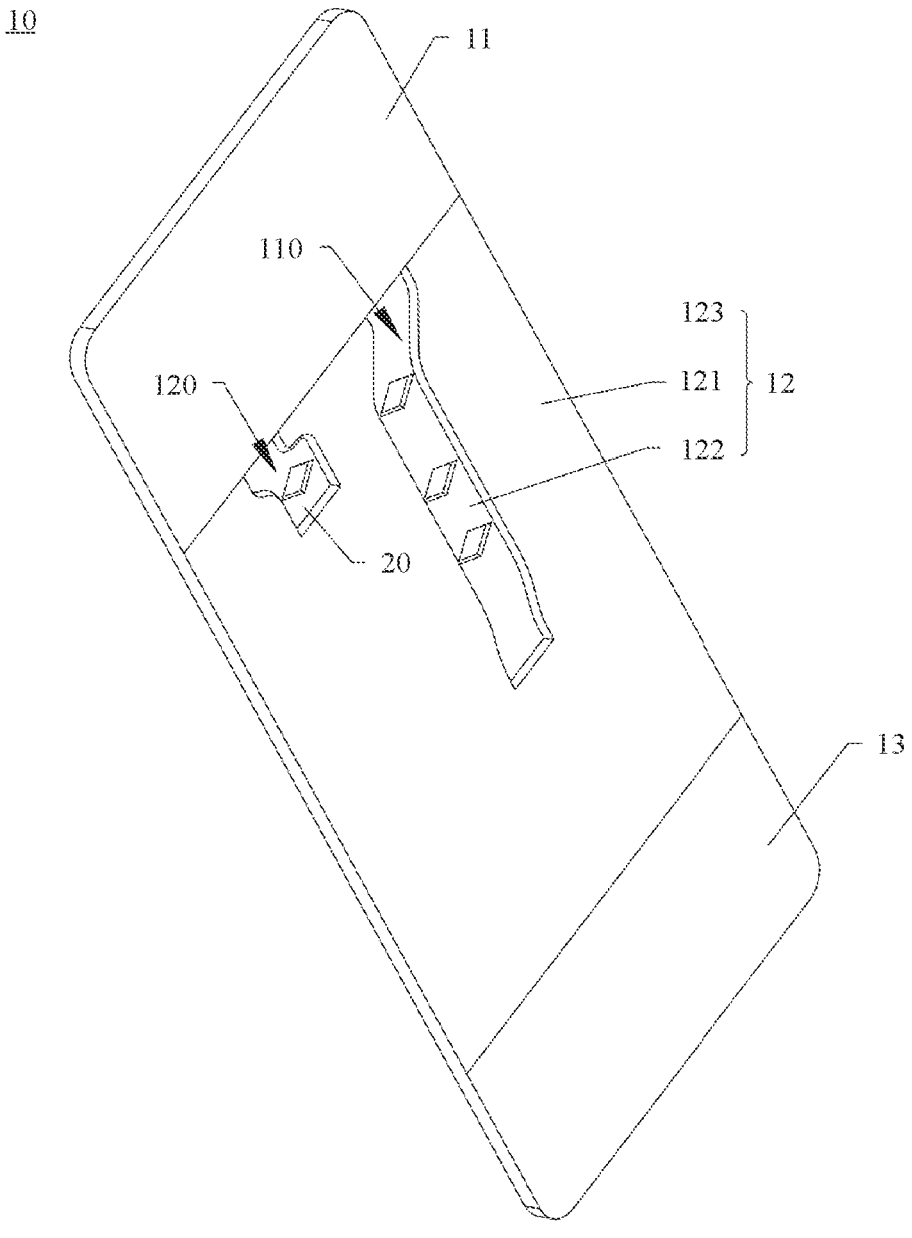
FIG. 3 is a schematic diagram of a structure of a middle frame shown in FIG. 2.

Refer to FIG. 1 and FIG. 3 together. FIG. 3 is a schematic diagram of a structure of the middle frame 10 shown in FIG. 2. The second plate 12 includes a flat part 121, a first recess part 122, and a second recess part 123 that are integrally molded. The first recess part 122 is recessed relative to the flat part 121 to form a first accommodation space 110. The first recess part 122 is recessed relative to the flat part 121 to form a second accommodation space 120. The first accommodation space 110 and the second accommodation space 120 may be grooves, or may be through holes. In this embodiment of this application, an example in which the first accommodation space 110 and the second accommodation space 120 are grooves is used for description.

A partial structure that is of the circuit board 105 and that is located on the second plate 12 is accommodated in the first accommodation space 110, and is located below the battery 102. A partial structure that is of the connection member 106 and that is located on the second plate 12 is accommodated in the second accommodation space 120, and is located below the battery 102. It may be understood that a portion that is of the circuit board 105 and that is located on the first plate 11 or the third plate 13 is disposed staggered with the battery 102, to be connected to the motherboard 103 or the secondary board 104. A portion that is of the connection member 106 and that is located on the first plate 11 is disposed staggered with the battery 102, to be electrically connected to a corresponding component and part. A shape of the first accommodation space 110 matches a shape of the circuit board 105, and a shape of the second accommodation space 120 matches a shape of the connection member 106. A person skilled in the art can correspondingly design shapes of the first accommodation space 110 and the second accommodation space 120 based on shapes of the circuit board 105 and the connection member 106 inside the electronic device 100.

In this embodiment, the second plate 12 is provided with the accommodation spaces configured to accommodate the circuit board 105 and the connection member 106, and a portion that is of the circuit board 105 or the connection member 106 and that is located below the battery 102 is embedded in the second plate 12, so that the second plate 12 shares a thickness space with the circuit board 105 or the connection member 106. This reduces a thickness of the electronic device 100.

For example, the bonding layer 108 includes a first bonding layer 81 and a second bonding layer 82. The first bonding layer 81 is bonded between the circuit board 105 and the middle frame 10, and the first bonding layer 81 is accommodated in the first accommodation space 110. The second bonding layer 82 is bonded between the connection member 106 and the middle frame 10, and the second bonding layer 82 is accommodated in the second accommodation space 120.

Figure 4:
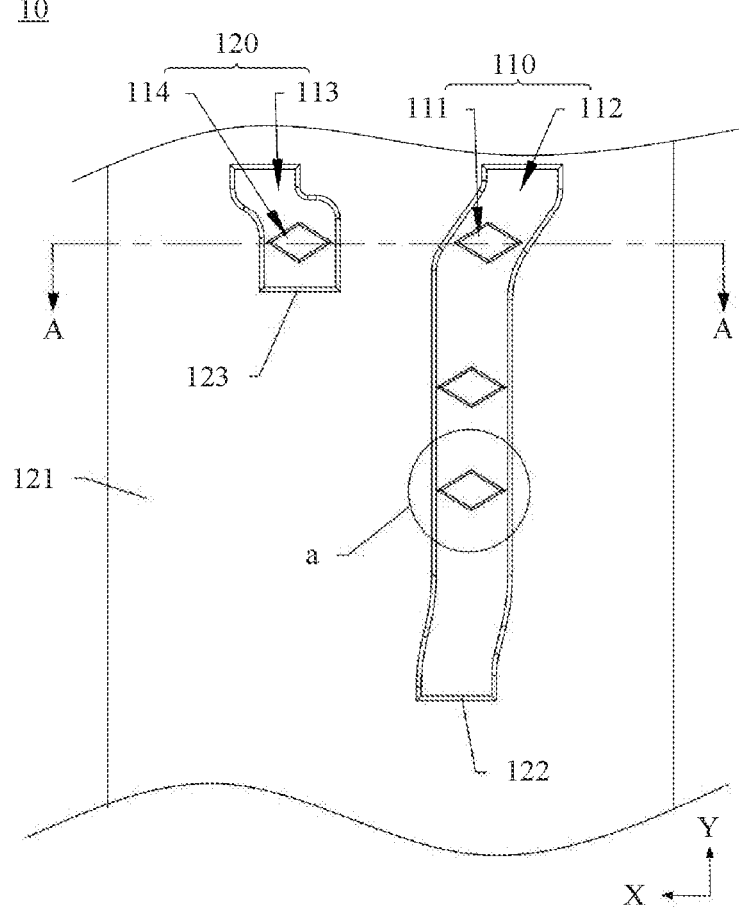
FIG. 4 is a top view of the middle frame shown in FIG. 3.
Figure 5:
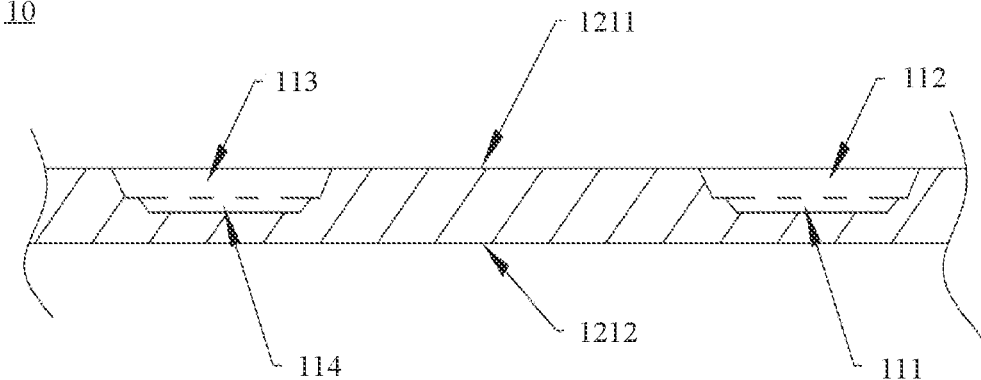
FIG. 5 is a schematic diagram of a cross section of the middle frame shown in FIG. 4 along an A-A line in a first embodiment.

Refer to FIG. 4 and FIG. 5 together. FIG. 4 is a top view of the middle frame 10 shown in FIG. 3; and FIG. 5 is a schematic diagram of a cross section of the middle frame 10 shown in FIG. 4 along an A-A line in a first embodiment. The first accommodation space 110 includes a first groove 111 and a second groove 112. An opening direction of the first groove 111 is the same as an opening direction of the second groove 112. The first groove 111 is located in the second groove 112, and a groove depth of the first groove 111 is greater than a groove depth of the second groove 112. It may be understood that a partial structure of the first groove 111 continues to be recessed in a direction toward the first surface relative to the second groove 112. The first groove 111 is configured to accommodate the first bonding layer 81, and the second groove 112 is configured to accommodate the circuit board 105. As shown in FIG. 4, the first groove 111 is located in a partial position of the second groove 112.

For example, the flat part 121 includes a first surface 1211 and a second surface 1212 that are disposed oppositely. The first surface 1211 faces the battery 102. Both openings of the first groove 111 and the second groove 112 are located on the first surface 1211. The first groove 111 and the second groove 112 are each recessed from a side that is of the first surface 1211 and that faces the second surface 1212, and do not run through the second surface 1212.

In this embodiment, an outer surface of the first bonding layer 81 is smaller than an outer surface of the circuit board 105, and the first bonding layer 81 is bonded to a local area of the circuit board 105. On a premise that the circuit board 105 and the middle frame 10 are bonded, a space occupied by the first bonding layer 81 is reduced. This facilitates miniaturization of the electronic device 100.

In some embodiments, the second accommodation space 120 includes a third groove 113 and a fourth groove 114. An opening direction of the third groove 113 is the same as an opening direction of the fourth groove 114. The fourth groove 114 is located in the third groove 113, and a groove depth of the fourth groove 114 is greater than a groove depth of the third groove 113. It may be understood that a partial structure of the fourth groove 114 continues to be recessed in a direction toward the first surface 1211 relative to the third groove 113. The fourth groove 114 is configured to accommodate the second bonding layer 82, and the third groove 113 is configured to accommodate the connection member 106. As shown in FIG. 4, the fourth groove 114 is located in a partial position of the third groove 113. In this embodiment, the second plate 12 is also correspondingly provided with the grooves configured to accommodate the connection member 106 and the second bonding layer 82. This reduces an overall thickness of the electronic device 100.

Refer to FIG. 2 and FIG. 4 together. The first bonding layer 81 includes a plurality of bonding sub-layers 108 that are spaced. There are a plurality of first grooves 111, and the plurality of first grooves 111 are spaced, and are all located in the second groove 112. The plurality of bonding sub-layers 108 are accommodated in the plurality of first grooves 111 in a one-to-one correspondence, to be bonded to different positions of the circuit board 105. This improves stability of bonding the circuit board 105 and the middle frame 10. Shapes of the plurality of first grooves 111 may be the same or may be different. This is not limited in this application. A quantity of the first grooves 111 is not limited in this application either, and the quantity in the figure is merely an example.

The flat part 121, the first recess part 122, and the second recess part 123 are prepared by using a die casting molding process. The die casting molding process is a casting method in which a molten material fills a mold cavity at a high speed under a high pressure, and the material solidifies under the pressure to form a die casting member. In this embodiment, the flat part 121, the first recess part 122, and the second recess part 123 are prepared by using the die casting molding process, so that costs of the middle frame 10 are reduced, and molding efficiency of the middle frame 10 is improved.

In this embodiment, the first groove 111 is located in the second groove 112, and a groove depth of the first groove 111 is greater than a groove depth of the second groove 112. In a die casting molding process of the middle frame 10, in a flow direction of a material, a mold cavity structure corresponding to a groove wall of the second groove 112 causes flow blocking of the material once, and a mold cavity structure corresponding to a groove wall of the first groove 111 causes flow blocking of the material again. A thickness of the flat part 121 that is integrally molded with the first recess part 122 and the second recess part 123 is affected, and finally a thickness of the middle frame 10 is affected.

In a conventional technology, the bottom wall of the first groove is a rectangle, and the flow direction of the material is perpendicular to a side edge of the rectangle. In the die casting molding process of the middle frame, the mold cavity structure corresponding to the groove wall of the first groove has strong flow blocking effect on the material, and a material on a rib in a slag discharge side is likely to turn cold and bad. As a result, a thickness of the molded middle frame is large. For example, thicknesses of the first recess part, the second recess part, and the flat part are large. This is not conducive to overall thinning of the middle frame.

In this application, a shape of the first recess part 122 in the middle frame 10 is changed, so that flow blocking of the material by a mold cavity structure corresponding to the first recess part 122 is reduced, the risk that the material on the rib in the slag discharge side is likely to turn cold is reduced, and large thicknesses of the first recess part 122, the second recess part 123, and the flat part 121 are avoided. This facilitates overall thinning of the middle frame 10.

Figure 6:
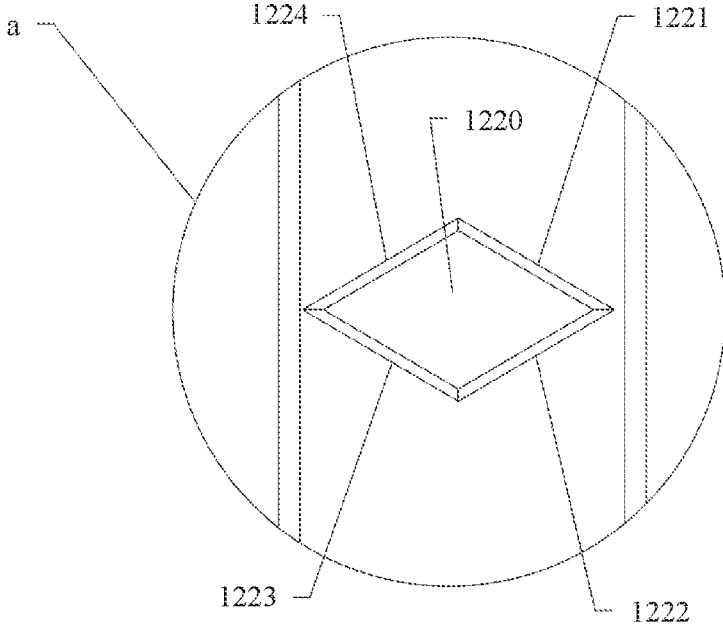
FIG. 6 is a schematic diagram of an enlarged structure of a portion a shown in FIG. 4.

Refer to FIG. 6. FIG. 6 is a schematic diagram of an enlarged structure of a portion a shown in FIG. 4. The first recess part 122 includes a bottom wall 1220, a first side wall 1221, and a second side wall 1222. An orientation of the bottom wall 1220 is the same as an orientation of the first surface 1211. The first side wall 1221 and the second side wall 1222 separately intersect the bottom wall 1220. The first side wall 1221 and the second side wall 1222 are connected and intersected. For example, a shape of the bottom wall 1220 is a quadrilateral. The groove wall of the first groove 111 further includes a third side wall 1223 and a fourth side wall 1224 that are connected and intersected. The third side wall 1223 is connected between the second side wall 1222 and the fourth side wall 1224, and the fourth side wall 1224 is connected between the first side wall 1221 and the third side wall 1223. The first side wall 1221, the second side wall 1222, the third side wall 1223, the fourth side wall 1224, and the bottom wall 1220 jointly enclose the first groove 111. It may be understood that the first side wall 1221, the second side wall 1222, the third side wall 1223, the fourth side wall 1224, and the bottom wall 1220 are all groove walls of the first groove 111.

As shown in FIG. 4, an opening formed by the first side wall 1221 and the second side wall 1222 is gradually enlarged in a first direction X. In the die casting molding process of the middle frame 10, the first direction X is parallel to a flow direction of a die casting material. For example, the first direction X is a direction in which a filling material flows along the middle frame 10 by a shortest distance. In this embodiment, an example in which the first direction X is a width direction of the middle frame 10 is used for description. It may be understood that the first direction X is a short-side direction of the middle frame 10. In another embodiment, the first direction X may alternatively be another direction of the middle frame 10. This is not limited in this application.

In this embodiment, the opening formed by the first side wall 1221 and the second side wall 1222 is gradually enlarged in the first direction X, and the opening direction is parallel to the flow direction of the material in the die casting molding process of the middle frame 10. The material gradually disperses along mold cavity side walls corresponding to the first side wall 1221 and the second side wall 1222, so that flow blocking of the material by the mold cavity side walls corresponding to the first side wall 1221 and the second side wall 1222 is reduced, the risk that the material on the rib in the slag discharge side is likely to turn cold is reduced, and the large thicknesses of the first recess part 122, the second recess part 123, and the flat part 121 of the middle frame 10 are avoided. This facilitates overall thinning of the middle frame 10.

The flat part 121 is thinned, and correspondingly the first recess part 122 and the second recess part 123 are also thinned. A reduced thickness of the flat part 121 may be different from a reduced thickness of the first recess part 122 or the second recess part 123. For example, the opening formed by the first side wall 1221 and the second side wall 1222 is gradually enlarged in the first direction X, so that a thickness of the flat part 121 can be reduced by at least 0.05 millimeters, and a thickness of the first recess part 122 or the second recess part 123 can be reduced by at least 0.03 millimeters.

In the flow direction of the material, a smaller angle formed by the first side wall 1221 and the second side wall 1222 indicates a smaller angle formed by the first side wall 1221 or the second side wall 1222 and the flow direction of the material, and smaller flow blocking of the material by the first side wall 1221 or the second side wall 1222. It may be understood that when the first side wall 1221 or the second side wall 1222 is perpendicular to the flow direction of the material, and the first side wall 1221 or the second side wall 1222 and the flow direction of the material form an acute angle, a partial structure of the first side wall 1221 or the second side wall 1222 is away from the flow direction of the material. As a result, flow blocking of the material by the first side wall 1221 or the second side wall 1222 is large.

In some embodiments, the angle formed by the first side wall 1221 and the second side wall 1222 is an acute angle. A specific angle formed by the first side wall 1221 and the second side wall 1222 is not limited in this application. For example, the angle formed by the first side wall 1221 and the second side wall 1222 is less than or equal to 80 degrees.

In this embodiment of this application, the angle formed by the first side wall 1221 and the second side wall 1222 is an acute angle. The angle formed by the first side wall 1221 and the second side wall 1222 is small. In the die casting molding process of the middle frame 10, flow blocking of the material by the first side wall 1221 and the second side wall 1222 is small, and flow blocking of the material by a groove wall of the first groove 111 is further reduced. This further facilitates thinning of the first recess part 122, the second recess part 123, and the flat part 121.

In some embodiments, an area of the bottom wall 1220 is large, and a bonding area between the middle frame 10 and the circuit board 105 is increased. This ensures stability of bonding the circuit board 105 and the middle frame 10 through the bonding layer 108. For example, the angle formed between the first side wall 1221 and the second side wall 1222 is greater than or equal to 15 degrees, to avoid a small area of the bottom wall 1220 caused by a small angle formed by the first side wall 1221 and the second side wall 1222. It may be understood that the angle formed by the first side wall 1221 and the second side wall 1222 should not be excessively small or excessively large. A specific value of the acute angle formed by the first side wall 1221 and the second side wall 1222 is not limited in this application. A person skilled in the art can design this based on an actual requirement.

In some embodiments, a length of the first side wall 1221 is equal to a length of the second side wall 1222. The first side wall 1221 and the second side wall 1222 are symmetrically disposed. In this embodiment, the first side wall 1221 and the second side wall 1222 are symmetrically disposed, and flow blocking of the material by the first side wall 1221 and the second side wall 1222 are the same, so that a side structure of the first side wall 1221 and a side structure of the second side wall 1222 are evenly arranged in thickness.

For example, shapes of the first side wall 1221, the second side wall 1222, the third side wall 1223, and the fourth side wall 1224 are the same. In this embodiment, an example in which the shape of the bottom wall 1220 is a rhombus is used for description. In another embodiment, the length of the first side wall 1221 may be different from a length of the third side wall 1223, or the length of the second side wall 1222 may be different from a length of the fourth side wall 1224. This is not limited in this application.

Still refer to FIG. 4 and FIG. 5. In some embodiments, a shape of the fourth groove 114 is the same as a shape of the first groove 111, and an opening formed by two adjacent side walls of the fourth groove 114 is gradually enlarged in the first direction X. For example, both a bottom wall 1220 of the fourth groove 114 and the bottom wall 1220 of the first groove 111 are in a rhombus shape. The groove depth of the fourth groove 114 is the same as the groove depth of the first groove 111, and the groove depth of the third groove 113 is the same as the groove depth of the second groove 112.

In this embodiment, the shape of the fourth groove 114 is the same as the shape of the first groove 111, and the opening formed by the two adjacent side walls of the fourth groove 114 is gradually enlarged. In the die casting molding process of the middle frame 10, flow blocking of the material by the mold cavity structure corresponding to the first recess part 122 is reduced, and flow blocking of the material by a mold cavity structure corresponding to the second recess part 123 is also reduced, so that the risk that the material on the rib in the slag discharge side is likely to turn cold is further reduced. This further facilitates thinning of the first recess part 122, the second recess part 123, and the flat part 121.

In another embodiment, the shape of the fourth groove 114 may alternatively be different from the shape of the first groove 111. This is not limited in this application. For example, the bottom wall 1220 of the first groove 111 is in a rhombus shape, and the bottom wall 1220 of the fourth groove 114 is in a rectangle shape.

Figure 7:
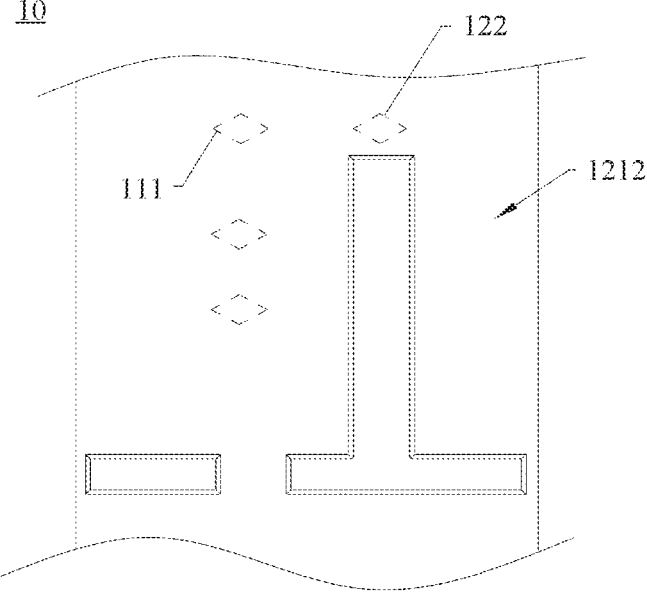
FIG. 7 is a schematic diagram of a structure of the middle frame shown in FIG. 3 from another perspective.

Refer to FIG. 5 and FIG. 7 together. FIG. 7 is a schematic diagram of a structure of the middle frame 10 shown in FIG. 3 from another perspective. FIG. 7 is a schematic diagram of a structure of the middle frame 10 that is shown in FIG. 4 and that is turned over by 180 degrees to another angle.

In this embodiment, a side that is of the bottom wall 1220 of the first groove 111 and that is away from the first surface 1211 is flush with the second surface 1212, and a side that is of the bottom wall 1220 of the fourth groove 114 and that is away from the first surface 1211 is flush with the second surface 1212. Shapes of the first groove 111 and the fourth groove 114 cannot be observed in a top view of the middle frame 10 at an angle along the second surface 1212. In FIG. 7, structures of the first groove 111 and the fourth groove 114 are identified by using dashed lines, to indicate approximate positions of the first groove 111 and the fourth groove 114. In this embodiment, both surfaces that are of the flat part 121 and that are disposed oppositely are in a planar shape.

Figure 8:
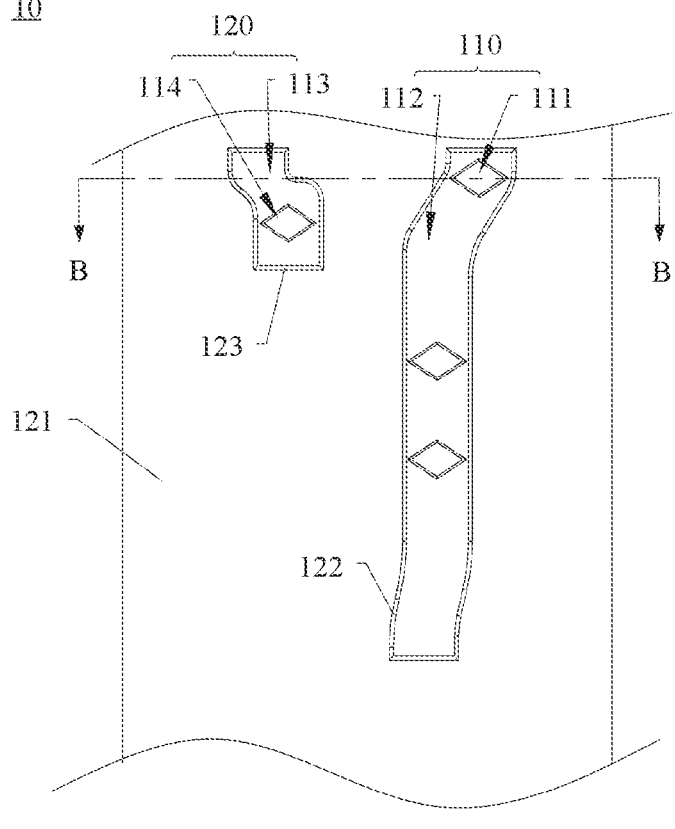
FIG. 8 is a schematic diagram of a structure of the middle frame shown in FIG. 1 in a second embodiment.
Figure 9:
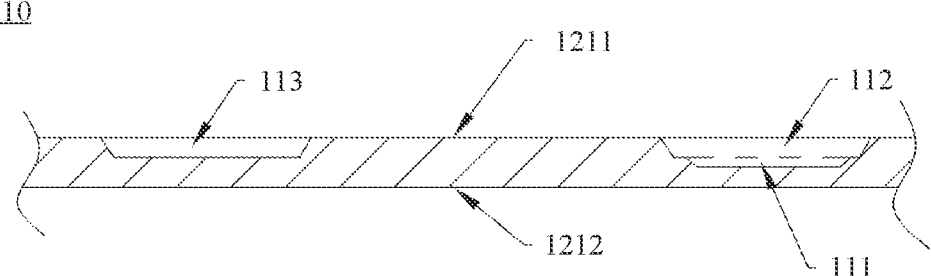
FIG. 9 is a schematic diagram of a cross section of the middle frame shown in FIG. 8 along a B-B line.

Still refer to FIG. 8 and FIG. 9. FIG. 8 is a schematic diagram of a structure of the middle frame 10 shown in FIG. 1 in a second embodiment; and FIG. 9 is a schematic diagram of a cross section of the middle frame 10 shown in FIG. 8 along a B-B line. The middle frame 10 in this embodiment includes most technical features of the first embodiment. Details of content of most technical solutions that are the same in this embodiment and the first embodiment are not described below again. For example, the middle frame 10 includes the flat part 121 and the first recess part 122 that are integrally molded, and the first recess part 122 is recessed inward relative to the first surface 1211 of the flat part 121 to form the first groove 111. The opening formed by the first side wall 1221 and the second side wall 1222 that are of the first groove 111 and that are adjacently disposed is gradually enlarged in the first direction X.

In this embodiment, the third groove 113 and the second groove 112 are disposed in a staggered manner, and in a second direction Y, the fourth groove 114 and the first groove 111 are disposed in a staggered manner. The second direction Y is perpendicular to the first direction X. For example, the second direction Y is a length direction of the middle frame 10. It may be understood that the fourth groove 114 and the first groove 111 are disposed in a staggered manner in both the first direction X and the second direction Y. The third groove 113 and the second groove 112 are disposed in a staggered manner only in the first direction X. As shown in FIG. 9, a sectional view of the middle frame 10 along a line parallel to the first direction X shows only the third groove 113, the second groove 112, and the first groove 11, and does not show the fourth groove 114.

In this embodiment, the fourth groove 114 and the first groove 111 are disposed in a staggered manner in both the first direction X and the second direction Y, so that an overlapping area between the fourth groove 114 and the first groove 111 is reduced. In the process of molding the middle frame 10, double or multiple flow blocking of the material by the mold cavity in a same direction is avoided, and a risk of a cold material on a rib in a slag discharge side in the mold cavity is reduced. This further facilitates thinning of the first recess part 122, the second recess part 123, and the flat part 121.

Figure 10:
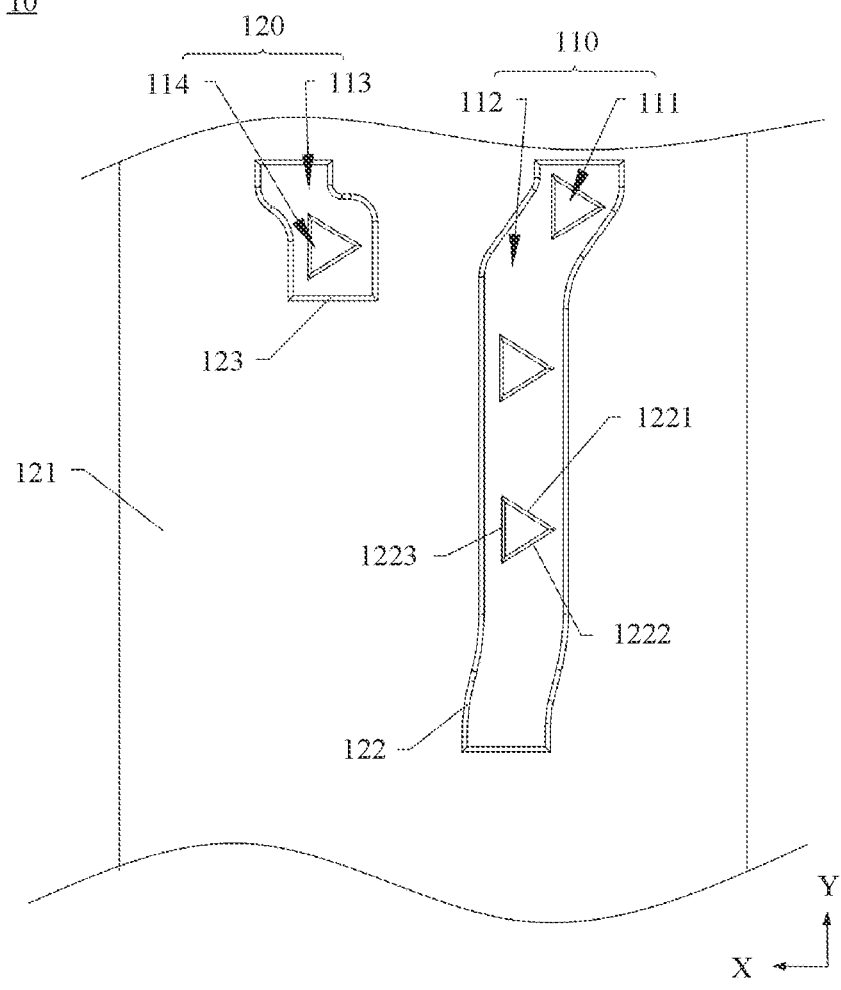
FIG. 10 is a schematic diagram of a structure of the middle frame shown in FIG. 1 in a third embodiment.

Refer to FIG. 10. FIG. 10 is a schematic diagram of a structure of the middle frame 10 shown in FIG. 1 in a third embodiment. The middle frame 10 in this embodiment includes most technical features of the foregoing embodiments. Details of content of most technical solutions that are the same in this embodiment and the foregoing embodiments are not described below again. For example, the middle frame 10 includes the flat part 121 and the first recess part 122 that are integrally molded, and the first recess part 122 is recessed inward relative to the first surface 1211 of the flat part 121 to form the first groove 111. The opening formed by the first side wall 1221 and the second side wall 1222 that are of the first groove 111 and that are adjacently disposed is gradually enlarged in the first direction X.

In this embodiment, the bottom wall 1220 of the first groove 111 is in a triangular shape. A side wall of the first groove 111 includes a first side wall 1221, a second side wall 1222, and a third side wall 1223. The first side wall 1221, the second side wall 1222, and the third side wall 1223 are connected to one another, and are connected to the bottom wall 1220. For example, the angle formed by the first side wall 1221 and the second side wall 1222 is 60 degrees, and the bottom wall 1220 is an equilateral triangle shape.

It may be understood that when the opening formed by the first side wall 1221 and the second side wall 1222 is gradually enlarged in the first direction X, the shape of the bottom wall 1220 may be a triangle, or may be a parallelogram, as described in this application. In another embodiment, the bottom wall 1220 may alternatively be in another shape, for example, a pentagon, a hexagon, or the like. This is not limited in this application.

Figure 11:
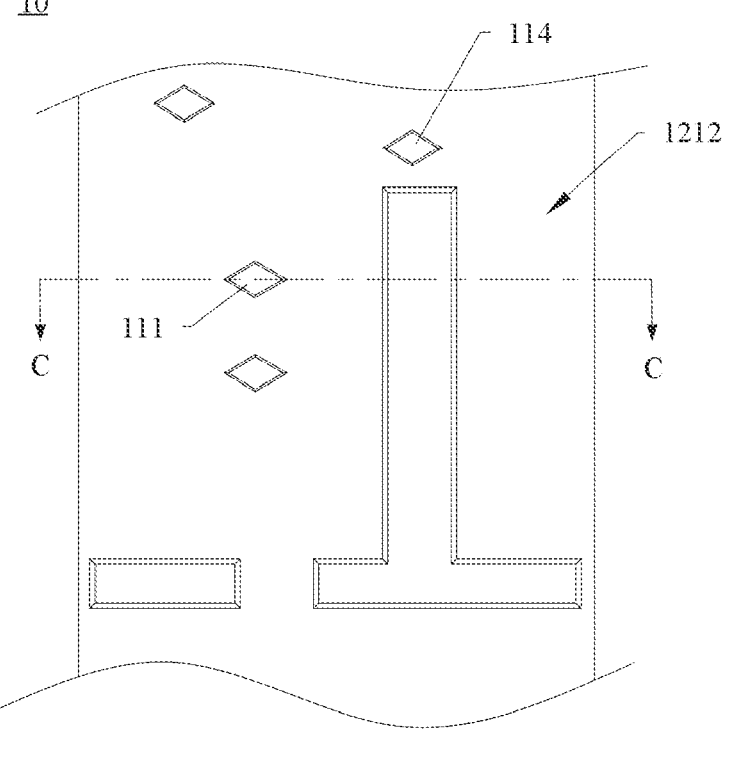
FIG. 11 is a schematic diagram of a structure of the middle frame shown in FIG. 1 in a fourth embodiment.
Figure 12:
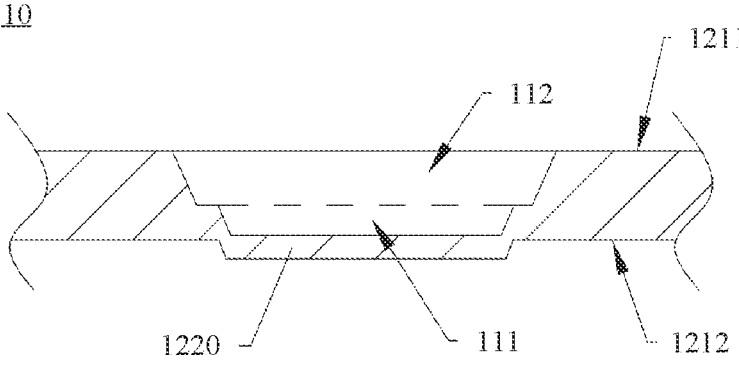
FIG. 12 is a schematic diagram of a cross section of the middle frame shown in FIG. 11 along a C-C line.

Refer to FIG. 11 and FIG. 12. FIG. 11 is a schematic diagram of a structure of the middle frame 10 shown in FIG. 1 in a fourth embodiment; and FIG. 12 is a schematic diagram of a cross section of the middle frame 10 shown in FIG. 11 along a C-C line. The middle frame 10 in this embodiment includes most technical features of the foregoing embodiments. Details of content of most technical solutions that are the same in this embodiment and the foregoing embodiments are not described below again. For example, the middle frame 10 includes the flat part 121 and the first recess part 122 that are integrally molded, and the first recess part 122 is recessed inward relative to the first surface 1211 of the flat part 121 to form the first groove 111. The opening formed by the first side wall 1221 and the second side wall 1222 that are of the first groove 111 and that are adjacently disposed is gradually enlarged in the first direction X.

In this embodiment, the first groove 111 is recessed from a side that is of the first surface 1211 and that faces the second surface 1212, and a side that is of the bottom wall 1220 of the first groove 111 and that is away from the first surface 1211 protrudes relative to the second surface 1212. As shown in FIG. 11, the shapes of the first groove 111 and the fourth groove 114 can be observed in a top view of the middle frame 10 at an angle along the second surface 1212. It may be understood that when groove depths of the first grooves 111 are equal, and the side that is of the bottom wall 1220 of the first groove 111 and that is away from the first surface 1211 protrudes relative to the second surface 1212, the bottom wall 1220 of the first groove 111 is thicker.

In this embodiment, the side that is of the bottom wall 1220 of the first groove 111 and that is away from the first surface 1211 protrudes relative to the second surface 1212, and this increases a thickness of the bottom wall 1220 of the first groove 111. In a process of molding the middle frame 10, flow blocking of a material in a mold cavity corresponding to the first groove 111 is small, a risk that a material on a rib in the slag discharge side is likely to turn cold is reduced, and the large thickness of the flat part 121 of the molded middle frame 10 is avoided. This facilitates thinning of the flat part 121 of the middle frame 10.

In some embodiments, a height by which the bottom wall 1220 of the first groove 111 protrudes relative to the second surface 1212 is less than or equal to 0.2 millimeters. For example, the height by which the bottom wall 1220 of the first groove 111 protrudes relative to the second surface 1212 is 0.16 millimeters, 0.1 millimeters, or 0.05 millimeters.

In this embodiment, the height by which the bottom wall 1220 of the first groove 111 protrudes relative to the second surface 1212 is small, and the thickness of the bottom wall 1220 of the first groove 111 is appropriately increased, to avoid an increase in an overall thickness of the middle frame 10 caused by a large thickness of the bottom wall 1220 of the first groove 111.

Figure 13:
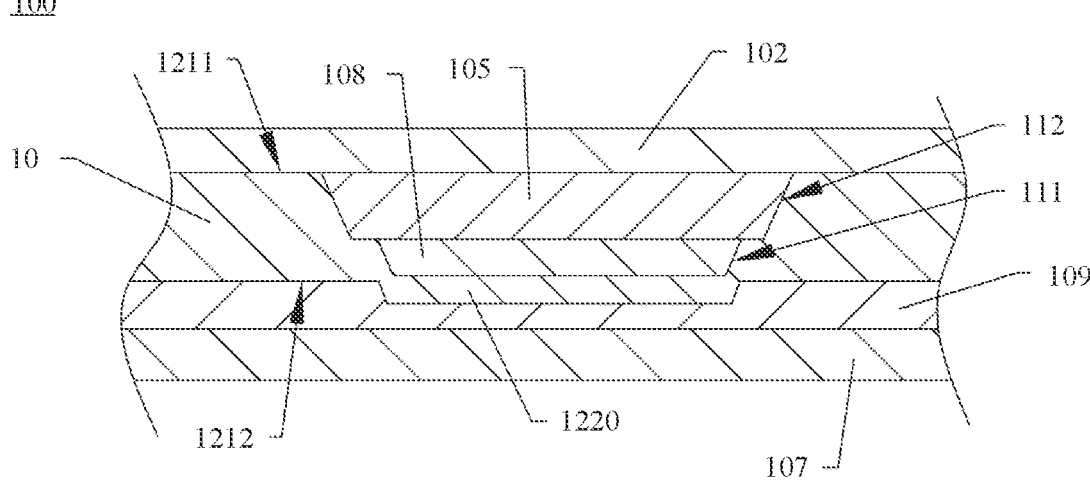
FIG. 13 is a schematic diagram of a partial cross section of an electronic device according to an embodiment of this application in another embodiment.

Still refer to FIG. 13. FIG. 13 is a schematic diagram of a partial cross section of the electronic device 100 according to an embodiment of this application in another embodiment. The electronic device 100 in this embodiment includes most technical features of the foregoing embodiments. Details of content of most technical solutions that are the same in this embodiment and the foregoing embodiments are not described below again. For example, the electronic device 100 includes the battery 102, the display 107, the middle frame 10, the motherboard, the secondary board, and the circuit board 105. The battery 102, the motherboard, and the secondary board are located on a same side of the middle frame 10, and are disposed in a staggered manner. The display 107 and the battery 102 are separately installed on two sides that are of the middle frame 10 and that are disposed oppositely. The circuit board 105 is electrically connected between the motherboard and the secondary board. The middle frame 10 includes the flat part 121 and the first recess part 122 that are integrally molded. The first recess part 122 is recessed relative to the flat part 121 to form the first groove 111. The flat part 121 is provided with the first surface 1211 and the second surface 1212 that are disposed oppositely. The first surface 1211 faces the battery 102, and the first groove 111 is recessed from the side that is of the first surface 1211 and that faces the second surface 1212.

In this embodiment, the side that is of the bottom wall 1220 of the first groove 111 and that is away from the first surface 1211 protrudes relative to the second surface 1212. In this embodiment, the side that is of the bottom wall 1220 of the first groove 111 and that is away from the first surface 1211 protrudes relative to the second surface 1212, and this increases the thickness of the bottom wall 1220 of the first groove 111. In the process of molding the middle frame 10, flow blocking of the material in the mold cavity corresponding to the first groove 111 is small, a risk that a material on a rib in a slag discharge side is likely to turn cold is reduced, and the large thickness of the flat part 121 of the molded middle frame 10 is avoided. This facilitates thinning of the flat part 121 of the middle frame 10.

The electronic device 100 further includes an auxiliary member 109. The auxiliary member 109 is located between the middle frame 10 and the display 107. For example, the auxiliary member 109 is a cooling fin. The cooling fin is configured to cool the display 107, to improve reliability of the electronic device 100. A shape of the auxiliary member 109 is not limited in this application, and the shape of the auxiliary member 109 in the figure is merely an example. The cooling fin may be but is not limited to a graphite sheet. In another embodiment, the auxiliary member 109 may alternatively be foam, a Mylar sheet, or the like. This is not limited in this application.

In this embodiment, the auxiliary member 109 is installed on the second surface 1212, and the portion that is of the bottom wall 1220 of the first groove 111 and that protrudes relative to the second surface 1212 is embedded in the first auxiliary member 109. In this embodiment, a structure that is of the first recess part 122 and that protrudes relative to the flat part 121 is embedded in the auxiliary member 109, and the auxiliary member 109 absorbs the structure that is of the first recess part 122 and that protrudes relative to the flat part 121, so that the display 107 can be flat installed relative to the middle frame 10.

It may be understood that a side that is of the auxiliary member 109 and that is away from the second surface 1212 is a flat surface, so that the display 107 is flat installed on the auxiliary member 109. For example, when the auxiliary member 109 is a cooling fin, the side that is of the auxiliary member 109 and that is away from the second surface 1212 is a flat surface, so that the display 107 is in full contact with the auxiliary member 109. This improves cooling effect of the auxiliary member 109 on the display 107.

In some embodiments, the first recess part 122 is recessed relative to the flat part 121 to further form the second groove 112. The opening direction of the second groove 112 is the same as the opening direction of the first groove 1. The first groove 111 is located in the second groove 112, and the groove depth of the first groove 111 is greater than the groove depth of the second groove 112. The electronic device 100 further includes the bonding layer 108, and the bonding layer 108 is connected between the circuit board 105 and a recess part. The bonding layer 108 is accommodated in the first groove 111, and a partial structure of the circuit board 105 is accommodated in the second groove 112.

In this embodiment, the groove depth of the first groove 111 is greater than the groove depth of the second groove 112, so that the bonding layer 108 is accommodated in the first groove 111. The partial structure of the circuit board 105 is accommodated in the second groove 112, so that the bonding layer 108 and the circuit board 105 share a thickness with the middle frame 10. This reduces the overall thickness of the electronic device 100.

The foregoing descriptions are merely specific implementations of this application, but are not intended to limit the protection scope of this application. Any variation or replacement readily figured out by a person skilled in the art within the technical scope disclosed in this application shall fall within the protection scope of this application. When no conflict occurs, embodiments of this application and the features in the embodiments may be mutually combined. Therefore, the protection scope of this application shall be subject to a protection scope of the claims.

What is claimed is:

1. A middle frame comprising:
a flat part comprising:
a first surface; and
a second surface disposed opposite to the first surface; and
a first recess part that is integrally molded with the flat part, is recessed relative to the first surface to form a first groove, and comprises a first opening on the first surface, wherein the first recess part comprises:
a bottom wall having a same orientation as the first surface;
a first side wall;
a second side wall, wherein the first side wall and the second side wall separately intersect with the bottom wall, and wherein the first side wall is coupled to the second side wall; and
a second opening formed by the first side wall and the second side wall, wherein the second opening is gradually enlarged in a first direction based on a flow direction of a die casting material.

2. The middle frame according to claim 1, wherein the first side wall and the second side wall form an acute angle.

3. The middle frame according to claim 1, wherein the bottom wall has a shape of a quadrilateral or a triangle.

4. The middle frame according to claim 1, wherein the first recess part is recessed relative to the flat part to form a second groove, comprising a third opening that has a same direction as the first opening, wherein the first groove is located in the second groove, and wherein the first groove has a first depth that is greater than a second depth of the second groove.

5. The middle frame according to claim 4, wherein the first surface comprises a first side, wherein the first groove is recessed from the first side and faces the second surface.

6. The middle frame according to claim 5, further comprising:
a first plate;
a second plate comprising:
a first end part coupled to the first plate; and
a second end part disposed opposite to the first end part, wherein the second groove extends from the first end part to the second end part; and
a third plate coupled to the second end part, wherein the first plate, the second plate, and the third plate are sequentially coupled and configured to carry different parts.

7. The middle frame according to claim 6, further comprising a second recess part integrally molded to the flat part, wherein the second recess part is recessed relative to the flat part to form a third groove and a fourth groove that are both recessed from the first side.

8. The middle frame according to claim 7, wherein the fourth groove has a same shape as the first groove and comprises a fourth opening formed by two adjacent side walls of the fourth groove, and wherein the fourth opening is gradually enlarged in the first direction.

9. The middle frame according to claim 7, wherein the fourth groove is located in the third groove and has a second depth that is greater than a first depth of the third groove, wherein the third groove and the second groove are disposed in a staggered manner in the first direction, and wherein the fourth groove and the first groove are disposed in a staggered manner in a second direction that is perpendicular to the first direction.

10. The middle frame according to claim 6, wherein a plurality of grooves that include the first groove are spaced and located in the second groove.

11. The middle frame according to claim 5, wherein the bottom wall comprises a second side that is away from the first surface and that protrudes relative to the second surface.

12. The middle frame according to claim 1, wherein the middle frame is configured to carry at least one of a motherboard, a secondary board, a circuit board, a display, or a battery.

13. A middle frame comprising:
a flat part comprising:
a first surface, wherein the first surface comprises a first side; and
a second surface disposed opposite to the first surface; and
a first recess part that is integrally molded with the flat part, is recessed relative to the first surface to form a first groove, and comprises a first opening on the first surface, wherein the first recess part comprises:
a bottom wall having a same orientation as the first surface;
a first side wall;
a second side wall, wherein the first side wall and the second side wall separately intersect with the bottom wall, and wherein the first side wall is coupled to the second side wall, and wherein the first groove is recessed from the first side and faces the second surface; and
a second opening formed by the first side wall and the second side wall, wherein the second opening is gradually enlarged in a first direction based on a flow direction of a die casting material.

14. The middle frame according to claim 13, further comprising:
a first plate;
a second plate comprising:
a first end part coupled to the first plate; and
a second end part disposed opposite to the first end part; and
a third plate coupled to the second end part, wherein the first plate, the second plate, and the third plate are sequentially coupled and configured to carry different parts.

15. The middle frame according to claim 14, wherein the first recess part is recessed relative to the flat part to form a second groove, wherein the second groove extends from the first end part to the second end part, and wherein a plurality of grooves that include the first groove are spaced and located in the second groove.

16. The middle frame according to claim 15, further comprising a second recess part integrally molded to the flat part, wherein the second recess part is recessed relative to the flat part to form a third groove and a fourth groove that are both recessed from the first side.

17. The middle frame according to claim 16, wherein the fourth groove has a same shape as the first groove and comprises a fourth opening formed by two adjacent side walls of the fourth groove, and wherein the fourth opening is gradually enlarged in the first direction.

18. The middle frame according to claim 16, wherein the fourth groove is located in the third groove and has a second depth that is greater than a first depth of the third groove, wherein the third groove and the second groove are disposed in a staggered manner in the first direction, and wherein the fourth groove and the first groove are disposed in a staggered manner in a second direction that is perpendicular to the first direction.

19. The middle frame according to claim 13, wherein the bottom wall comprises a second side that is away from the first surface and that protrudes relative to the second surface.

20. A middle frame comprising:

a flat part comprising:

a first surface; and a second surface disposed opposite to the first surface; and a first recess part that is integrally molded with the flat part, is recessed relative to the first surface to form a first groove, and comprises a first opening on the first surface, wherein the first recess part comprises:

a bottom wall having a same orientation as the first surface;

a first side wall;

a second side wall, wherein the first side wall and the second side wall separately intersect with the bottom wall, and wherein the first side wall is coupled to the second side wall; and a second opening formed by the first side wall and the second side wall, wherein the second opening is gradually enlarged in a first direction based on a flow direction of a die casting material, wherein the middle frame is configured to be disposed in an electronic device and to carry a battery of the electronic device.

\* \* \* \* \*